US006931317B2

(12) United States Patent
Bruns

(10) Patent No.: US 6,931,317 B2
(45) Date of Patent: Aug. 16, 2005

(54) METHODS AND DEVICES FOR DETERMINING A CORRECTION VALUE FOR A MEASURED SEGMENT TIME

(75) Inventor: Carsten Bruns, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/979,625

(22) Filed: Nov. 2, 2004

(65) Prior Publication Data

US 2005/0061064 A1 Mar. 24, 2005

Related U.S. Application Data

(63) Continuation of application No. PCT/EP04/002261, filed on Mar. 5, 2004.

(30) Foreign Application Priority Data

Apr. 25, 2003 (DE) .......................................... 103 18 839

(51) Int. Cl.$^{7}$ ............................................. G06F 19/00
(52) U.S. Cl. ....................................... 701/102; 701/110
(58) Field of Search ................................ 701/101, 102, 701/105, 106, 110, 116, 117

(56) References Cited

U.S. PATENT DOCUMENTS

| 5,047,943 | A | * | 9/1991 | Takahata et al. ............ 701/101 |
| 5,188,081 | A | * | 2/1993 | Birk et al. .................. 123/479 |
| 5,197,325 | A | * | 3/1993 | Tamura et al. ............. 73/117.3 |
| 5,734,100 | A | | 3/1998 | Kishimoto et al. ........ 73/117.3 |

FOREIGN PATENT DOCUMENTS

| DE | 41 33 679 A1 | 4/1993 |
| DE | 195 44 720 C1 | 3/1997 |
| DE | 195 40 675 C1 | 4/1997 |
| DE | 196 22 042 A1 | 12/1997 |
| DE | 195 40 674 C2 | 1/1999 |
| EP | 0 583 495 A1 | 8/1992 |
| WO | WO 97/22786 | 6/1997 |

* cited by examiner

Primary Examiner—John T. Kwon
(74) Attorney, Agent, or Firm—Baker Botts L.L.P.

(57) ABSTRACT

A method and device for determining a correction value for a measured segment time, which a shaft of an internal combustion engine, in particular a crankshaft, needs in order to rotate about a defined angular range, evaluate the following relationship in order to determine correction values for individual cylinders:

$$AZ_n = [(TG_n - TG_0) - (n/z)*(TG_{0'} - TG_0)]/[TG_0 + (n/z)*(TG_{0'} - TG_0)],$$

where z is the number of cylinders of the internal combustion engine, n is the number of the cylinder currently under consideration, $TG_n$ is the measured segment time of the cylinder with the number n, $TG_0$ is the measured segment time of a reference segment of a reference cylinder, $TG_{0'}$ is the segment time of the reference segment of the reference cylinder measured two crankshaft rotations after the segment time $TG_0$, and $AZ_n$ is a correction value for the segment time of the cylinder with the number n.

32 Claims, 3 Drawing Sheets

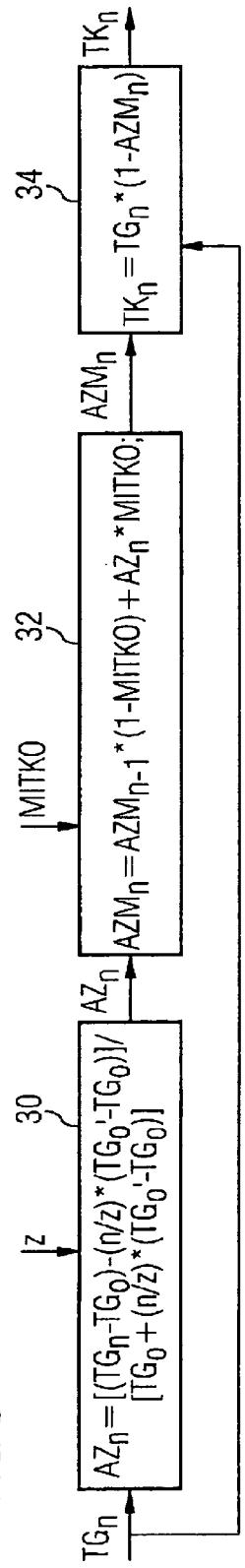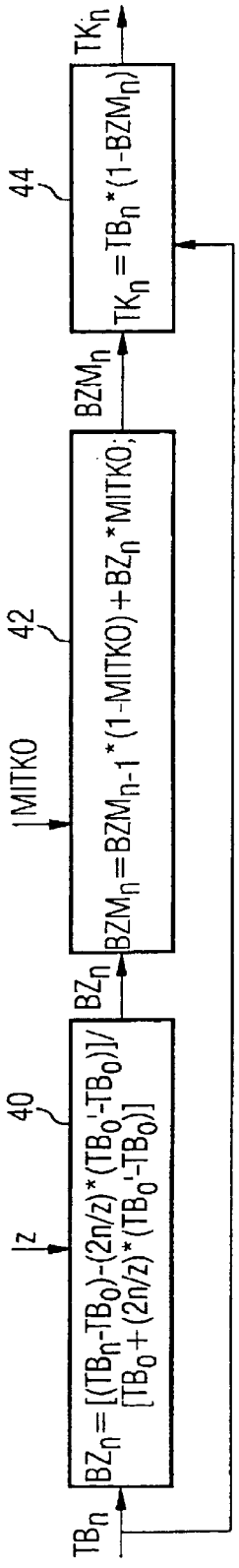
FIG 3
FIG 4

METHODS AND DEVICES FOR DETERMINING A CORRECTION VALUE FOR A MEASURED SEGMENT TIME

CROSS REFERENCE TO RELATED APPLICATION

This application is a continuation of copending International Application No. PCT/EP2004/002261 filed Mar. 5, 2004 which designates the United States, and claims priority to German application no. 103 18 839.8 filed Apr. 25, 2003.

TECHNICAL FIELD OF THE INVENTION

The invention relates to methods and devices for determining a correction value for a measured segment time, which a shaft of an internal combustion engine, in particular a crankshaft, needs in order to rotate about a defined angular range.

DESCRIPTION OF THE RELATED ART

Measurement of the segment time is effected in that the shaft itself or a tachometer disk connected to it have markings which are scanned by sensors. The sensor system can for example comprise an inductive sensor or a Hall-effect sensor and a segment wheel. The time which the shaft needs in order to rotate about a certain angle of rotation is measured. In general, the rotational speed of the shaft can be measured by this means. It is, however, also possible, to record fluctuations in the rotational speed, the accuracy of resolution depending on the interval between the markings on the circumference of the shaft or of the tachometer disk, that is, on the segment size. Such measurements are used in particular in order to determine the irregular operation of internal combustion engines, where, for example, a brief deceleration of the angular velocity of the crankshaft can be linked to a misfire. This applies in particular if the markings on the crankshaft or the tachometer disk are applied at an interval corresponding to the working strokes of the individual cylinders.

In practice, however, the markings or the tachometer disk can have mechanical defects or inaccuracies, for example angular errors of the segments or marking teeth of the tachometer disk, a disk eccentricity or variances in the form of the teeth. Such defects or inaccuracies lead to the result of the angular-velocity measurements being invalidated.

With regard to solving this problem, it is known from European patent EP 0 583 495 A1 for the mechanical defects or inaccuracies caused by errors in the measurement of segment times to be detected and compensated for.

According to a first embodiment described in patent application EP 0 583 495 A1, the segment times are measured for a reference segment at intervals of two crankshaft rotations. The further segment times measured between these two measurements are compared with the reference segment and, depending on the time difference calculated, a correction value is determined which enables correction of the measured segment time for individual cylinders. The following mathematical relationship is evaluated for this purpose:

$$AZ'_n = (TG_n - TG_0)/TG_0 + \qquad \text{(Formula 1)}$$
$$[n/(z*TG_0)]*(TG_0 - TG_{0'})$$
$$= [(TG_n - TG_0) - (n/z)*(TG_{0'} - TG_0)]/TG_0,$$

where
z is the number of cylinders of the internal combustion engine, n is the number of the cylinder currently under consideration, $TG_n$ is the measured segment time of the cylinder with the number n, $TG_0$ is the measured segment time of a reference segment of a reference cylinder, $TG_{0'}$ is the segment time of the reference segment of the reference cylinder measured two crankshaft rotations after the segment time $TG_0$, and $AZ'_n$ is a correction value for the segment time of the cylinder with the number n.

In this expression, $TG_n - TG_0$ corresponds to a comparison of the segment time of segment n with the segment time of reference segment n=0. The two times $TG_0$ and $TG_{0'}$ are measured in the same segment so that a change in the rotational speed can be concluded directly from the difference between them. The decrease in the rotational speed for the full 720° KW, which lie between 0' and 0, does not affect the segment to be adapted. The correction factor n/z is therefore included.

A second embodiment described in the patent application EP 0 583 495 A1 provides that the segment times for a reference segment are measured at intervals of one crankshaft rotation. The further segment times measured between these two measurements are compared with this reference segment and, depending on the time difference calculated, a correction value is determined which enables correction of the measured segment time for individual segments. The following relationship is evaluated for this purpose:

$$BZ'_n = (TB_n - TB_0)/TB_0 + \qquad \text{(Formula 2)}$$
$$[n/((z/2)*TG_0)]*(TG_0 - TG_{0'})$$
$$= [(TB_n - TB_0) - (2n/z)*(TB_{0'} - TB_0)]/TB_0,$$

where
z is the number of cylinders of the internal combustion engine, n is the number of the segment currently under consideration, $TB_n$ is the measured segment time of the segment with the number n, $TB_0$ is the measured segment time of a reference segment, $TB_{0'}$ is the segment time of the reference segment measured one crankshaft rotation after the segment time $TG_0$, and $BZ'_n$ is a correction value for the segment time of the segment with the number n.

Here the reference segment differs from the reference segment according to the first method described in EP 0 583 495 A1 in that it can no longer be assigned to a specific cylinder, but concerns a specific marked segment of the crankshaft which is defined as error-free.

The two methods known from EP 0 583 495 A1 for detecting and correcting errors in the determination of the segment time function satisfactorily only in the case of small rotational-speed gradients. This restriction of the adaption to small rotational-speed gradients derives from the fact that the two above-mentioned relationships take only insufficient account of a change in rotational speed.

This is shown below for the first embodiment of the method known from EP 0 583 495 A1. The segment n has, compared with the reference segment, the relative error F, which has to be adapted. At constant rotational speed, the following applies:

$$TG_n = TG_0*(1+F). \qquad \text{(Formula 3)}$$

If the rotational speed is not constant, the change in the segment time between 0 and 0' has to be taken into account proportionately. The following then applies:

$$TG_n = [TG_0 + (n/z)^*(TG_{0'} - TG_0)]^*(1+F). \quad \text{(Formula 4)}$$

If Formula 4 is inserted in Formula 1, then after appropriate reformulation the following is obtained:

$$AZ'_n = \{F^*[TG_0 + (n/z)^*(TG_{0'} - TG_0)]\}/TG_0. \quad \text{(Formula 5)}$$

It can be seen from Formula 5 that the adaption value determined $AZ_n$ matches the error F only in the case where $TG_{0'} - TG_0 = 0$, that is where rotational speed is constant. In other cases, a variance is produced which increases as the rotational-speed gradient increases and leads to errors.

SUMMARY OF THE INVENTION

The object of the invention is to further develop the generic methods and the generic devices such that a suitable correction value can be determined for any rotational-speed gradient.

A first embodiment of the inventive method builds on the generic method in that, when determining the correction values, the following relationship is evaluated:

$$AZ_n = [(TG_n - TG_0) - (n/z)^*(TG_{0'} - TG_0)]/[TG_0 + (n/z)^*(TG_{0'} + TG_0)], \quad \text{(Formula 6)}$$

where z is the number of cylinders of the internal combustion engine, n is the number of the cylinder currently under consideration, $TG_n$ is the measured segment time of the cylinder with the number n, $TG_0$ is the measured segment time of a reference segment of a reference cylinder, $TG_{0'}$ is the segment time of the reference segment of the reference cylinder measured two crankshaft rotations after the segment time $TG_0$, and $AZ_n$ is a correction value for the segment time of the cylinder with the number n.

If Formula 4 is inserted in Formula 6, then after appropriate reformulation, the following is obtained:

$$F = AZ_n,$$

that is, the adaption value determined corresponds precisely to the predetermined error F, irrespective of any rotational-speed gradients present. This is particularly advantageous since the adaption values in some internal combustion engines are subject to rotational-speed-dependent drift, which makes it necessary to extend the limited range of adaption options in the prior art in order to be able to detect misfires more accurately. This not only increases customer satisfaction but also makes it easier to comply with the statutory requirements.

A second embodiment of the inventive method builds on the generic prior art in that, when determining the correction value, the following relationship is evaluated:

$$BZ_n = [(TB_n - TB_0) - (2n/z)^*(TB_{0'} - TB_0)]/[TB_0 + (2n/z)^*(TB_{0'} - TB_0)], \quad \text{(Formula 7)}$$

where z is the number of cylinders of the internal combustion engine, n is the number of the segment currently under consideration, $TB_n$ is the measured segment time of the segment with the number n, $TB_0$ is the measured segment time of a reference segment, $TB_{0'}$ is the segment time of the reference segment measured one crankshaft rotation after the segment time $TG_0$, and $BZ_n$ is a correction value for the segment time of the segment with the number n.

In this case, too, the calculated correction value matches exactly the error, irrespective of any rotational-speed gradients present.

As in the case of the second embodiment of the cited prior art, the reference segment can in the second embodiment of the inventive method also no longer be assigned to a specific cylinder. Furthermore, the correction values are determined for all segments which are located on the crankshaft in the course of one rotation of the crankshaft. Half the number of cylinders z, that is, z/2, is used as an upper limit for the number of segments. For this reason, the second embodiment of the inventive methods is primarily suited for even-numbered cylinder counts z. In other respects, the reader is referred to the comments regarding the first embodiment of the inventive methods.

The following preferred further developments of the inventive methods are suitable both for the first and for the second embodiment.

A first preferred further development provides that the corrected segment times $TK_n$ are determined by means of the following relationship:

$$TK_n = TG_n^*(1 - AZ_n) \text{ or}$$

$$TK_n = TB_n^*(1 - BZ_n).$$

Alternatively it can be provided that the corrected segment times $TK_n$ are determined by means of the following relationship:

$$TK_n = TG_n^*(1 - AZM_n) \text{ or}$$

$$TK_n = TB_n^*(1 - BZM_n),$$

where $AZM_n$ or $BZM_n$ are averaged correction values. Averaging is generally recommended since the systematic errors of the segments may have random errors such as fluctuations in the system clock speed on which the control system is based, tolerances in the switching accuracy of the sensors, general oscillations or malfunctions stemming from the drive train, etc. superimposed upon them.

In the relationship described above, it is also preferred for the averaged correction values $AZM_n$ or $BZM_n$ to be determined by calculating a sliding average by means of the relationship $$AZM_n = AZM_{n-1}^*(1 - MITKO) + AZ_n^*MITKO \text{ or}$$

$$BZM_n = BZM_{n-1}^*(1 - MITKO) + BZ_n^*MITKO$$

where MITKO represents a selectable averaging constant with a value range between zero and one.

Another preferred further development of the inventive methods provides that the correction value $AZ_n$ or $BZ_n$ and/or the averaged correction value $AZM_n$ or $BZM_n$ is preset to an initialization value, preferably to zero, if no correction value or no suitable correction value $AZ_n$ or $BZ_n$ and/or no suitable averaged correction value $AZM_n$ or $BZM_n$ is available. A state in which no suitable correction value is available is, for example, the very first start of operation of the internal combustion engine. However, it is also conceivable for the determination of the correction value to be reset, for example, following a repair of the internal combustion engine.

For the inventive methods, it is also preferred that the correction value $AZ_n$ or $BZ_n$ and/or the averaged correction value $AZM_n$ or $BZM_n$ be set upon a start of operation of the engine to the last determined and stored correction value $AZ_n$ or $BZ_n$ and/or the last determined and stored averaged correction value $AZM_n$ or $BZM_n$, and that correction of the segment times be carried out only after a predetermined number ZS of steps for calculating correction values $AZ_n$ or $BZ_n$ and/or averaged correction values $AZM_n$ or $BZM_n$. It can be ascertained by this means for example that more prevalent rotational-speed fluctuations during the start-up phase impact too heavily on the correction values, which can be of significance, particularly in the case of averaged correction values.

Insofar as averaged correction values are used, a preferred further development of the inventive method provides in the relationship described above that the predetermined number ZS of steps is inversely proportional to the averaging constant MITKO.

A first embodiment of the inventive device builds on the generic prior art in that, in determining the correction value, it evaluates the following relationship:

$$AZ_n=[(TG_n-TG_0)-(n/z)*(TG_{0'}-TG_0)]/[TG_0+(n/z)*(TG_{0'}-TG_0)],$$

where z is the number of cylinders of the internal combustion engine, n is the number of the cylinder currently under consideration, $TG_n$ is the measured segment time of the cylinder with the number n, $TG_0$ is the measured segment time of a reference segment of a reference cylinder, $TG_{0'}$ is the segment time of the reference segment of the reference cylinder measured two crankshaft rotations after the segment time $TG_0$, and $AZ_n$ is a correction value for the segment time of the cylinder with the number n.

This produces in the same or a similar manner the characteristics and benefits described in connection with the first embodiment of the inventive methods, which is why, to avoid repetition, the reader is referred to the corresponding comments.

The same applies by analogy to the second embodiment of the inventive device specified below and to the preferred designs and further developments which can be implemented both in the case of the first and in the case of the second embodiment of the inventive device.

The second embodiment of the inventive device builds on the generic prior art in that, in determining the correction value, it evaluates the following relationship:

$$BZ_n=[(TB_n-TB_0)-(2n/z)*(TB_{0'}-TB_0)]/[TB_0+(2n/z)*(TB_{0'}-TB_0)],$$

where z is the number of cylinders of the internal combustion engine, n is the number of the segment currently under consideration, $TB_n$ is the measured segment time of the segment with the number n, $TB_0$ is the measured segment time of a reference segment, $TB_{0'}$ is the segment time of the reference segment measured one crankshaft rotation after the segment time $TG_0$, and $BZ_n$ is a correction value for the segment time of the segment with the number n.

In both embodiments of the inventive device it can be provided that it determines the corrected segment times ($TK_n$) by means of the following relationship:

$$TK_n=TG_n*(1-AZ_n) \text{ or}$$

$$TK_n=TB_n*(1-BZ_n).$$

It can furthermore be provided that it determines the corrected segment times $TK_n$ by means of the following relationship:

$$TK_n=TG_n*(1-AZM_n) \text{ or}$$

$$TK_n=TB_n*(1-BZM_n),$$

where $AZM_n$ or $BZM_n$ are averaged correction values.

It is also preferred for the inventive device that it determine the averaged correction values $AZM_n$ or $BZM_n$ by calculating a sliding average by means of the relationship $$AZM_n=AZM_{n-1}*(1-MITKO)+AZ_n*MITKO \text{ or}$$

$$BZM_n=BZM_{n-1}*(1-MITKO)+BZ_n*MITKO$$

where MITKO represents a selectable averaging constant with a value range between zero and one.

It can further be provided that it presets the correction value $AZ_n$ or $BZ_n$ and/or the averaged correction value $AZM_n$ or $BZM_n$ to an initialization value, preferably to zero, if no correction value or no suitable correction value $AZ_n$ or $BZ_n$ and/or no suitable averaged correction value $AZM_n$ or $BZM_n$ is available.

It can also be provided in both embodiments of the inventive device that it sets the correction value $AZ_n$ or $BZ_n$ and/or the averaged correction value $AZM_n$ or $BZM_n$ upon a start of engine operation to the last determined and stored correction value $AZ_n$ or $BZ_n$ and/or the last determined and stored averaged correction value $AZM_n$ or $BZM_n$, and that it carries out the correction of the segment times only after a predetermined number ZS of steps for calculating correction values $AZ_n$ or $BZ_n$ and/or averaged correction values $AZM_n$ or $BZM_n$.

In this case, it is also preferred that the predetermined number ZS of steps be inversely proportional to the averaging constant MITKO.

BRIEF DESCRIPTION OF THE DRAWINGS

Preferred embodiments of the invention will now be described by way of example with reference to the attached drawings in which:

FIG. 3 shows a block diagram which illustrates schematically a first embodiment of the inventive device, this embodiment being suitable for implementing the first embodiment of the inventive method; and FIG. 4 shows a block diagram which illustrates schematically a second embodiment of the inventive device, this embodiment being suitable for implementing the second embodiment of the inventive method.

DETAILED DESCRIPTION OF THE PREFERRED EMBODIMENTS

Figure 1:
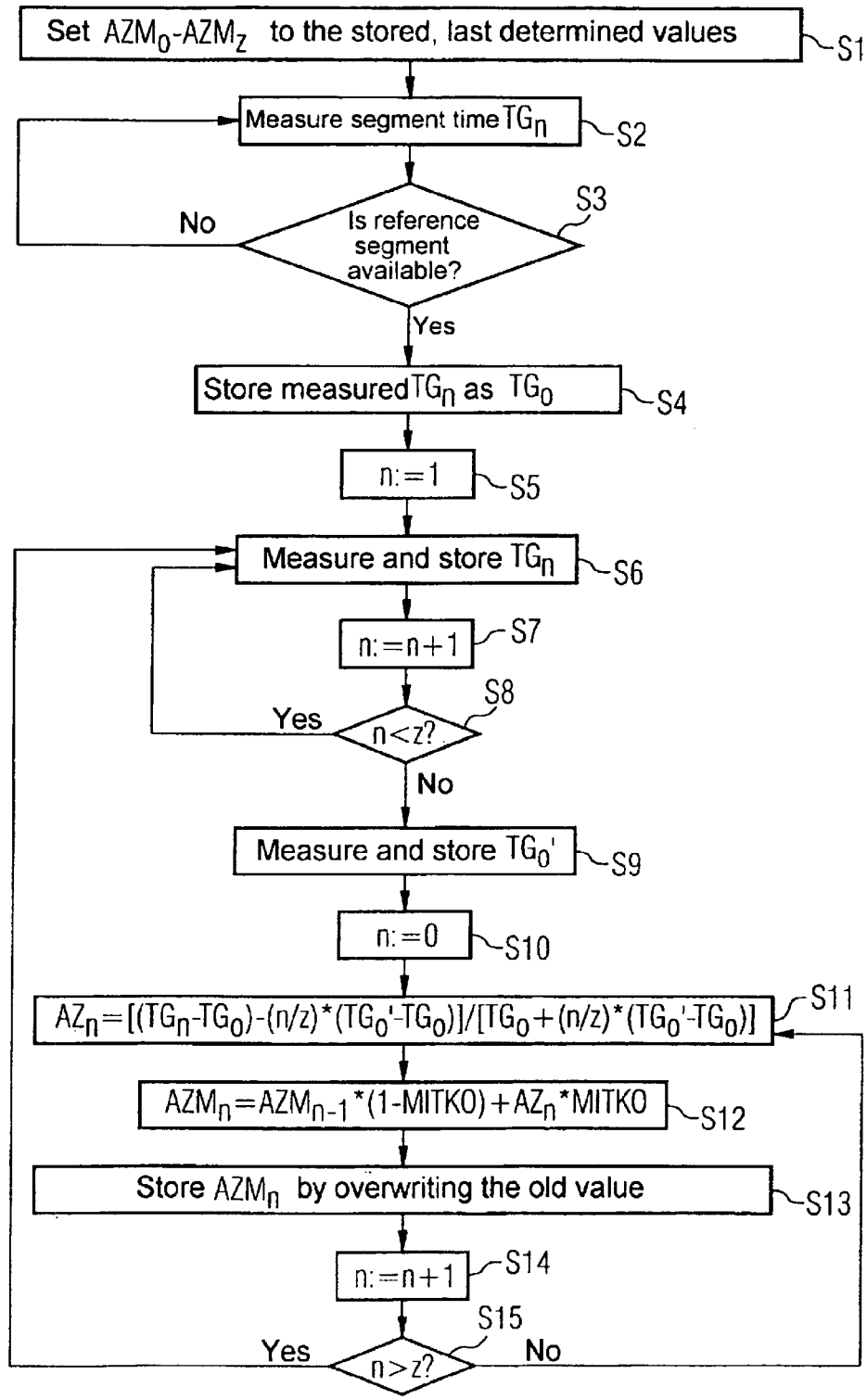
FIG. 1 shows a flow chart which illustrates a first embodiment of the inventive method.

FIG. 1 shows a first embodiment of the inventive method, the embodiment shown in FIG. 1 being provided for determining correction values for individual cylinders. The method shown begins with step S1, in which the averaged correction values $AZM_0$ to $AZM_n$ are set to the stored, last determined values, so that the averaged correction values AZM$_0$ to AZM$_n$ have the values which applied during the last engine operation. In step S2 of the method, the segment time TG$_n$ of the current segment n is measured. A check is then performed in step S3 of the method as to whether the measured segment time was the time of the reference segment. A random segment can be chosen as a reference segment, advantageously the first in the ignition sequence of the cylinders. This reference segment is defined or assumed to be free from defects. If it was established in step S3 that the reference segment is not available, then the flow branches back to step S2, and the next segment time TG$_n$ is measured. As soon as it is established in step S3 that the reference segment is available, the flow branches to step S4. In step S4 the measured segment time is stored as the segment time of the reference segment TG$_0$. In the following steps S5 to S8 the segment times of the succeeding segments which are logically assigned to the individual cylinders of the internal combustion engine are then measured consecutively. In method step S7, a counter is initially set to n:=1 for this purpose. Then in method step S6 the current segment time TG$_n$ is measured and stored. Thereafter, in step S7 the counter is set to n:=n+1. If the segment time has been determined for all the segments assigned to the individual cylinders, then the flow branches to method step S9, in which the segment time of the reference segment TG$_0$, is again measured and stored, in this case two crankshaft rotations after the measurement of TG$_0$. In method steps S10 to S15, the correction values AZ$_n$ or the averaged correction values AZM$_n$ for the individual segments assigned to the cylinders are then determined. In step S10, a counter is initially set to n:=0 for this purpose. Then in step S11, the correction value AZ$_n$ for the segment or the cylinder n is then determined by means of the relationship $$AZ_n=[(TG_n-TG_0)-(n/z)*(TG_{0'}-TG_0)]/[TG_0+(n/z)*(TG_{0'}-TG_0)]$$

where z—as mentioned—indicates the number of cylinders of the internal combustion engine. In step S12, an averaged correction value AZM$_n$ is calculated from an earlier averaged correction value AZM$_{n}$-1, an averaging constant MITKO and the correction value AZ$_n$. In step S13, the averaged correction value AZM$_n$ calculated in step S12 is stored by overwriting the old value. In step S14, n is increased by one. Once all the (averaged) correction values have been determined, that is, in step S15 n>z, then the flow branches back to step S6. In order that the next segment times can immediately be used to determine correction values, the last measured segment time TG$_{0'}$, of the reference segment is used as the new segment time TG$_0$ to be measured in the next cycle.

Figure 2:
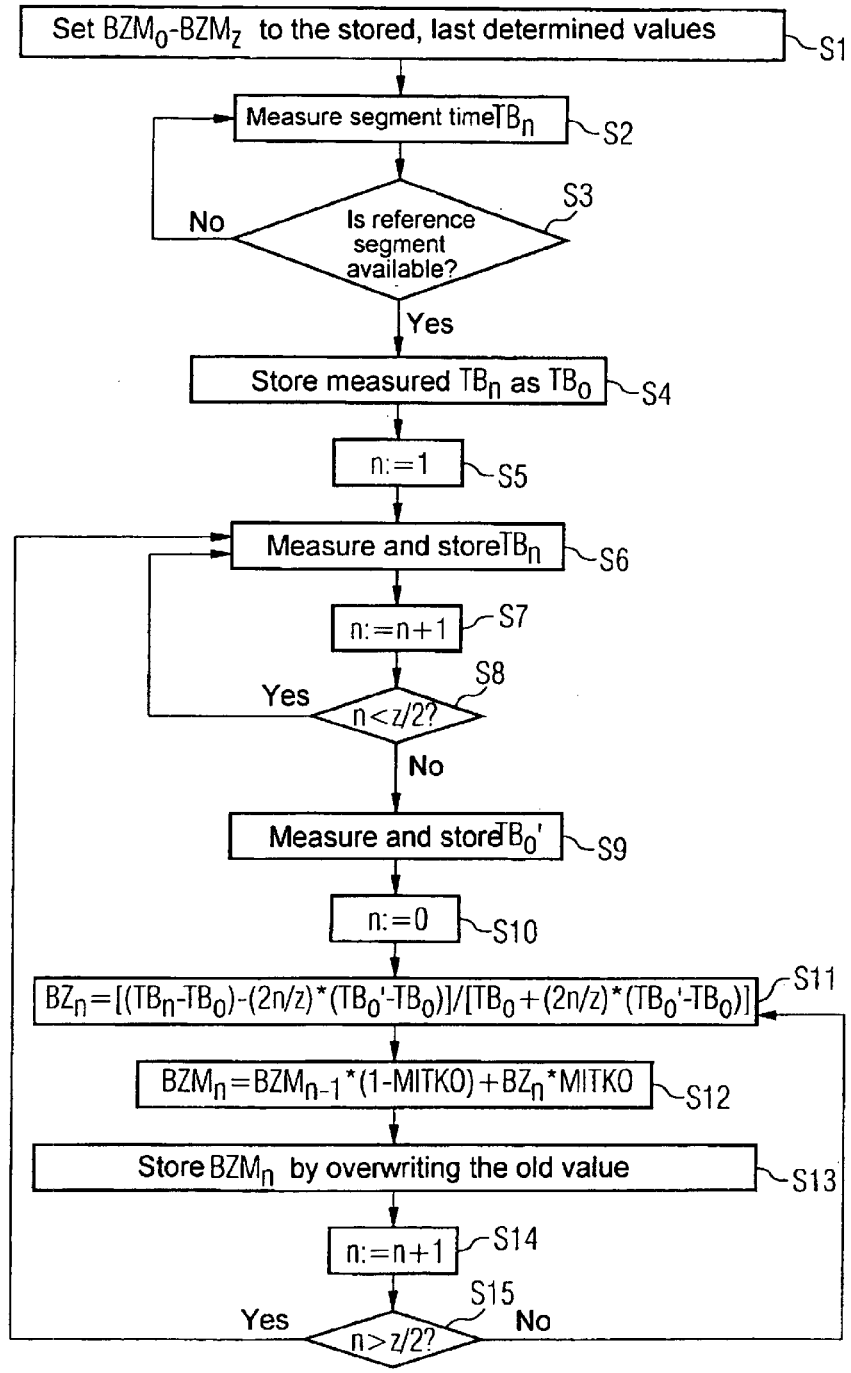
FIG. 2 shows a flow chart which illustrates a second embodiment of the inventive method.

FIG. 2 shows a second embodiment of the inventive method, correction values being determined with this embodiment for individual segments. Steps S1 to S7 correspond to the steps S1 to S7 described in FIG. 1, the averaged correction values in this embodiment being designated BZM$_0$ to BZM$_z$ and the measured segment times TB$_n$. In this embodiment, the number of segments on the crankshaft or on the tachometer disk is restricted to half the number of cylinders of the internal combustion engine, that is, to z/2. The flow therefore branches from step S8 to step S9 if the condition n<z/2 is not met. In step S9, the segment time of the reference segment is again measured and stored as TB$_{0'}$. In contrast to the embodiment described in FIG. 1, the new measurement of the segment time of the reference segment occurs after just one crankshaft rotation. In the subsequent steps S10 to S15, the correction values BZ$_n$ or the averaged correction values BZM$_n$ are calculated and stored. To this end, in step S10 the counter is initially set to n:=0. In step S11, BZ$_n$ is then determined by means of the relationship $$BZ_n=[(TB_n-TB_0)-(2n/z)*(TB_{0'}-TB_0)]/[TB_0+(2n/z)*(TB_{0'}+TB_0)],$$

Thereafter, in step S12 the averaged correction value BZM$_n$ is determined by means of the relationship $$BZM_n=BZM_{n-1}*(1-MITKO)+BZ_n*MITKO$$

This averaged correction value is stored in step S13 by overwriting the old value. Then in step S14, n is increased by one and in step S15 a check is performed as to whether the calculation has been carried out for all segments, that is, whether n>z/2. Provided the calculation has been carried out for all segments, the flow branches again to step S6. In this case also, the last measured segment time of the reference segment TB$_{0'}$, can be chosen as the new value for TB$_0$, so as to be able to continue the method directly.

FIG. 3 shows a block diagram which illustrates schematically a first embodiment of the inventive device, this embodiment being suitable for implementing the first embodiment of the inventive method. Here, the block 30 calculates, depending on the segment times TG$_n$ fed to this block and the number of cylinders z also fed to it, the correction values AZ$_n$ which are fed to the block 32. The block 32 determines from the correction value AZ$_n$, a correction constant MITKO and from a previous averaged correction value AZM$_{n-1}$ the averaged correction value AZM$_n$. Both the measured segment time TG$_n$ and the averaged correction value AZM$_n$ are fed to block 34. From these, the block 34 determines a corrected segment time TK$_n$. The embodiment shown in FIG. 3 is provided to supply corrected segment times TK$_n$ for individual cylinders.

FIG. 4 shows a block diagram which illustrates schematically a second embodiment of the inventive device, this embodiment being suitable for performing the second embodiment of the inventive method. In contrast to the device shown in FIG. 3, the device shown in FIG. 4 is provided for determining correction values for individual segments. The reader is referred in this regard to the differences described in FIGS. 1 and 2. According to the diagram in FIG. 4, a block 40 calculates the correction values BZ$_n$. The respective correction value BZ$_n$ is fed to block 42, as is the averaging constant MITKO, from which block 42 calculates an averaged correction value BZM$_n$. By analogy with block 34 in FIG. 3, the corrected segment time TK$_n$ is calculated in block 44.

The embodiments of the inventive devices shown in FIGS. 3 and 4 can be implemented in a particularly preferable manner in a combination of suitable hardware and software, which one skilled in the art will readily recognize. This does not, however, exclude the use of any other suitable circuit engineering.

The features of the invention disclosed in the preceding description, in the drawings and in the claims may, both individually and in random combination, be essential to implementation of the invention.

I claim:

1. A method for determining a correction value for a measured segment time, which a shaft of an internal combustion engine needs in order to rotate about a defined angular range, comprising the step of:

in determining the correction value, the following relationship is evaluated:

$$AZ_n=[(TG_n-TG_0)-(n/z)*(TG_{0'}-TG_0)]/[TG_0+(n/z)*(TG_{0'}-TG_0)]$$

wherein z is the number of cylinders of the internal combustion engine, n is the number of the cylinder currently under consideration, $TG_n$ is the measured segment time of the cylinder with the number n, $TG_0$ is the measured segment time of a reference segment of a reference cylinder, $TG_{0'}$ is the segment time of the reference segment of the reference cylinder measured two crankshaft rotations after the segment time $TG_0$, and $AZ_n$ is a correction value for the segment time of the cylinder with the number n.

2. The method according to claim 1, wherein corrected segment times ($TK_n$) are determined by means of the following relationship:

$$TK_n=TG_n*(1-AZ_n) \text{ or}$$

$$TK_n=TB_n*(1-BZ_n).$$

3. The method according to claim 1, wherein the corrected segment times ($TK_n$) are determined by means of the following relationship:

$$TK_n=TG_n*(1-AZM_n) \text{ or}$$

$$TK_n=TB_n*(1-BZM_n),$$

wherein $AZM_n$ or $BZM_n$ are averaged correction values.

4. The method according to claim 3, wherein the averaged correction values $AZM_n$ or $BZM_n$ are determined by calculating a sliding average by means of the relationship $$AZM_n=AZM_{n-1}*(1-MITKO)+AZ_n*MITKO \text{ or}$$

$$BZM_n=BZM_{n-1}*(1-MITKO)+BZ_n*MITKO$$

wherein MITKO represents a selectable averaging constant with a value range between zero and one.

5. The method according to claim 1, wherein the correction value $AZ_n$ or $BZ_n$ and/or the averaged correction value $AZM_n$ or $BZM_n$ is preset to an initialization value, preferably to zero, if no correction value or no suitable correction value $AZ_n$ or $BZ_n$ and/or no suitable averaged correction value $AZM_n$ or $BZM_n$ is available.

6. The method according to claim 1, wherein the correction value $AZ_n$ or $BZ_n$ and/or the averaged correction value $AZM_n$ or $BZM_n$ upon a start of engine operation is set to the last determined and stored correction value $AZ_n$ or $BZ_n$ and/or the last determined and stored averaged correction value $AZM_n$ or $BZM_n$, and wherein correction of the segment times is carried out only after a predetermined number ZS of steps for calculating correction values $AZ_n$ or $BZ_n$ and/or averaged correction values $AZM_n$ or $BZM_n$.

7. The method according to claim 4, wherein the correction value $AZ_n$ or $BZ_n$ and/or the averaged correction value $AZM_n$ or $BZM_n$ upon a start of engine operation is set to the last determined and stored correction value $AZ_n$ or $BZ_n$ and/or the last determined and stored averaged correction value $AZM_n$ or $BZM_n$, and wherein correction of the segment times is carried out only after a predetermined number ZS of steps for calculating correction values $AZ_n$ or $BZ_n$ and/or averaged correction values $AZM_n$ or $BZM_n$, and wherein the predetermined number ZS of steps is inversely proportional to the averaging constant MITKO.

8. The method according to claim 1, wherein the shaft is a crankshaft.

9. A method for determining a correction value for a measured segment time, which a shaft of an internal combustion engine, in particular a crankshaft, needs in order to rotate about a defined angular range, comprising the step of: in determining the correction value, the following relationship is evaluated:

$$BZ_n=[(TB_n-TB_0)-(2n/z)*(TB_{0'}-TB_0)]/[TB_0+(2n/z)*(TB_{0'}-TB_0)],$$

wherein z is the number of cylinders of the internal combustion engine, n is the number of the segment currently under consideration, $TB_n$ is the measured segment time of the segment with the number n, TB0 is the measured segment time of a reference segment, TB0' is the segment time of the reference segment measured one crankshaft rotation after the segment time $TG_0$, and $BZ_n$ is a correction value for the segment time of the segment with the number n.

10. The method according to claim 9, wherein corrected segment times ($TK_n$) are determined by means of the following relationship:

$$TK_n=TG_n*(1-AZ_n) \text{ or}$$

$$TK_n=TB_n*(1-BZ_n).$$

11. The method according to claim 9, wherein the corrected segment times ($TK_n$) are determined by means of the following relationship:

$$TK_n=TG_n*(1-AZM_n) \text{ or}$$

$$TK_n=TB_n*(1-BZM_n),$$

wherein $AZM_n$ or $BZM_n$ are averaged correction values.

12. The method according to claim 11, wherein the averaged correction values $AZM_n$ or $BZM_n$ are determined by calculating a sliding average by means of the relationship $$AZM_n=AZM_{n-1}*(1-MITKO)+AZ_n*MITKO \text{ or}$$

$$BZM_n=BZM_{n-1}*(1-MITKO)+BZ_n*MITKO$$

wherein MITKO represents a selectable averaging constant with a value range between zero and one.

13. The method according to claim 9, wherein the correction value $AZ_n$ or $BZ_n$ and/or the averaged correction value $AZM_n$ or $BZM_n$ is preset to an initialization value, preferably to zero, if no correction value or no suitable correction value $AZ_n$ or $BZ_n$ and/or no suitable averaged correction value $AZM_n$ or $BZM_n$ is available.

14. The method according to claim 9, wherein the correction value $AZ_n$ or $BZ_n$ and/or the averaged correction value $AZM_n$ or $BZM_n$ upon a start of engine operation is set to the last determined and stored correction value $AZ_n$ or $BZ_n$ and/or the last determined and stored averaged correction value $AZM_n$ or $BZM_n$, and wherein correction of the segment times is carried out only after a predetermined number ZS of steps for calculating correction values $AZ_n$ or $BZ_n$ and/or averaged correction values $AZM_n$ or $BZM_n$.

15. The method according to claim 11, wherein the correction value $AZ_n$ or $BZ_n$ and/or the averaged correction value $AZM_n$ or $BZM_n$ upon a start of engine operation is set to the last determined and stored correction value $AZ_n$ or $BZ_n$ and/or the last determined and stored averaged correction value $AZM_n$ or $BZM_n$, and wherein correction of the segment times is carried out only after a predetermined number ZS of steps for calculating correction values $AZ_n$ or $BZ_n$ and/or averaged correction values $AZM_n$ or $BZM_n$, and wherein the predetermined number ZS of steps is inversely proportional to the averaging constant MITKO.

16. The method according to claim 9, wherein the shaft is a crankshaft.

17. A device for determining a correction value for a measured segment time, which a shaft of an internal combustion engine needs in order to rotate about a defined angular range, the device comprises means to determine the correction value by evaluating the following relationship:

$$AZ_n=[(TG_n-TG_0)-(n/z)*(TG_{0'}-TG_0)]/[TG_0+(n/z)*(TG_{0'}-TG_0)],$$

wherein z is the number of cylinders of the internal combustion engine, n is the number of the cylinder currently under consideration, $TG_n$ is the measured segment time of the cylinder with the number n, TG0 is the measured segment time of a reference segment of a reference cylinder, $TG_{0'}$ is the segment time of the reference segment of the reference cylinder measured two crankshaft rotations after the segment time $TG_0$, and $AZ_n$ is a correction value for the segment time of the cylinder with the number n.

18. The device according to claim 17, comprising means to determine the corrected segment times ($TK_n$) by means of the following relationship:

$$TK_n=TG_n*(1-AZ_n) \text{ or}$$

$$TK_n=TB_n*(1-BZ_n).$$

19. The device according to claim 17, comprising means to determine the corrected segment times $TK_n$ by means of the following relationship:

$$TK_n=TG_n*(1-AZM_n) \text{ or}$$

$$TK_n=TB_n*(1-BZM_n),$$

wherein $AZM_n$ or $BZM_n$ are averaged correction values.

20. The device according to claim 19, comprising means to determine the averaged correction values $AZM_n$ or $BZM_n$ by calculating a sliding average by means of the relationship $$AZM_n=AZM_{n-1}*(1-MITKO)+AZ_n*MITKO \text{ or}$$

$$BZM_n=BZM_{n-1}*(1-MITKO)+BZ_n*MITKO$$

wherein MITKO represents a selectable averaging constant with a value range between zero and one.

21. The device according to claim 17, comprising means tp preset the correction value $AZ_n$ or $BZ_n$ and/or the averaged correction value $AZM_n$ or $BZM_n$ to an initialization value, preferably to zero, if no correction value or no suitable correction value $AZ_n$ or $BZ_n$ and/or no suitable averaged correction value $AZM_n$ or $BZM_n$ is available.

22. The device according to claim 17, comprising means to set the correction value $AZ_n$ or $BZ_n$ and/or the averaged correction value $AZM_n$ or $BZM_n$ upon a start of engine operation to the last determined and stored correction value $AZ_n$ or $BZ_n$ and/or the last determined and stored averaged correction value $AZM_n$ or $BZM_n$, and means to carry out the correction of the segment times only after a predetermined number ZS of steps for calculating correction values $AZ_n$ or $BZ_n$ and/or averaged correction values $AZM_n$ or $BZM_n$.

23. The device according to claim 20, comprising means to set the correction value $AZ_n$ or $BZ_n$ and the averaged correction value $AZM_n$ or $BZM_n$ upon a start of engine operation to the last determined and stored correction value $AZ_n$ or $BZ_n$ and/or the last determined and stored averaged correction value $AZM_n$ or $BZM_n$, and means to carry out the correction of the segment times only after a predetermined number ZS of steps for calculating correction values $AZ_n$ or $BZ_n$ and/or averaged correction values $AZM_n$ or $BZM_n$, wherein the predetermined number ZS of steps is inversely proportional to the averaging constant MITKO.

24. The device according to claim 17, wherein the shaft is a crankshaft.

25. A device for determining a correction value for a measured segment time, which a shaft of an internal combustion engine needs in order to rotate about a defined angular range, comprising means to determine the correction value by evaluating the following relationship:

$$BZ_n=[(TB_n-TB_0)-(2n/z)*(TB_{0'}-TB_0)]/[TB_0+(2n/z)*TB_{0'}-TB_0)],$$

wherein z is the number of cylinders of the internal combustion engine, n is the number of the segment currently under consideration, TBn is the measured segment time of the segment with the number n, TB0 is the measured segment time of a reference segment, TB0' is the segment time of the reference segment measured one crankshaft rotation after the segment time TG0, and $BZ_n$ is a correction value for the segment time of the segment with the number n.

26. The device according to claim 25, comprising means to determine the corrected segment times ($TK_n$) by means of the following relationship:

$$TK_n=TG_n*(1-AZ_n) \text{ or}$$

$$TK_n=TB_n*(1-BZ_n).$$

27. The device according to claim 25, comprising means to determine the corrected segment times $TK_n$ by means of the following relationship:

$$TK_n=TG_n*(1-AZM_n) \text{ or}$$

$$TK_n=TB_n*(1-BZM_n),$$

wherein $AZM_n$ or $BZM_n$ are averaged correction values.

28. The device according to claim 27, comprising means to determine the averaged correction values $AZM_n$ or $BZM_n$ by calculating a sliding average by means of the relationship $$AZM_n=AZM_{n-1}*(1-MITKO)+AZ_n*MITKO \text{ or}$$

$$BZM_n=BZM_{n-1}*(1-MITKO)+BZ_n*MITKO$$

wherein MITKO represents a selectable averaging constant with a value range between zero and one.

29. The device according to claim 25, comprising means tp preset the correction value $AZ_n$ or $BZ_n$ and/or the averaged correction value $AZM_n$ or $BZM_n$ to an initialization value, preferably to zero, if no correction value or no suitable correction value $AZ_n$ or $BZ_n$ and/or no suitable averaged correction value $AZM_n$ or $BZM_n$ is available.

30. The device according to claim 25, comprising means to set the correction value $AZ_n$ or $BZ_n$ and/or the averaged correction value $AZM_n$ or $BZM_n$ upon a start of engine operation to the last determined and stored correction value $AZ_n$ or $BZ_n$ and/or the last determined and stored averaged correction value $AZM_n$ or $BZM_n$, and means to carry out the correction of the segment times only after a predetermined number ZS of steps for calculating correction values $AZ_n$ or $BZ_n$ and/or averaged correction values $AZM_n$ or $BZM_n$.

31. The device according to claim 28, comprising means to set the correction value $AZ_n$ or $BZ_n$ and/or the averaged correction value $AZM_n$ or $BZM_n$ upon a start of engine operation to the last determined and stored correction value $AZ_n$ or $BZ_n$ and/or the last determined and stored averaged correction value $AZM_n$ or $BZM_n$, and means to carry out the correction of the segment times only after a predetermined number ZS of steps for calculating correction values $AZ_n$ or $BZ_n$ and/or averaged correction values $AZM_n$ or $BZM_n$, wherein the predetermined number ZS of steps is inversely proportional to the averaging constant MITKO.

32. The device according to claim 25, wherein the shaft is a crankshaft.

* * * * *